L. S. GRAVES.
SELF FUSING SOLDER.
APPLICATION FILED OCT. 19, 1911.
1,151,679.
Patented Aug. 31, 1915.
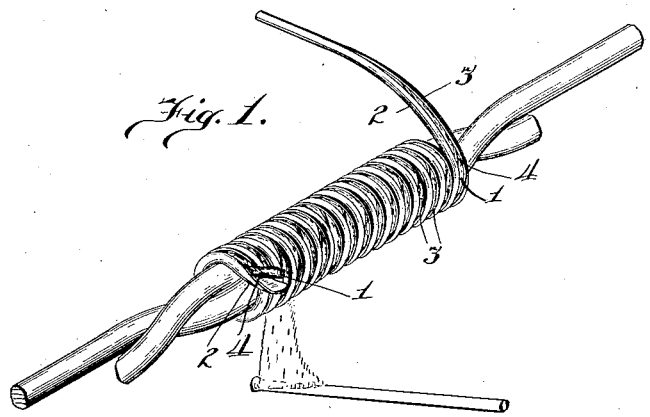
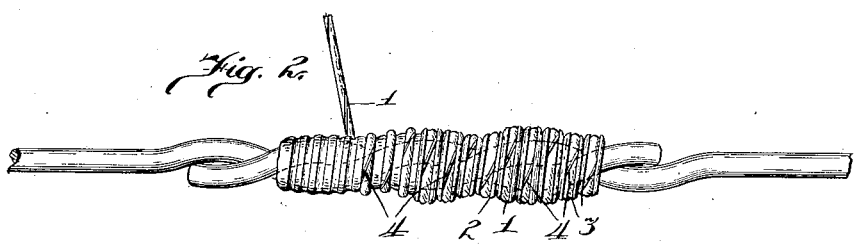
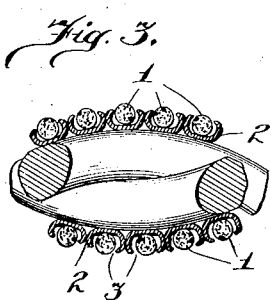
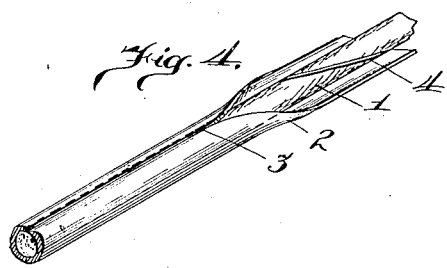
Witnesses
Milton Lenoir
Emilie Rose
Inventor,
Lester S. Graves
By Offield Towle Graves & Offield
Attorneys

UNITED STATES PATENT OFFICE.

LESTER S. GRAVES, OF EVANSTON, ILLINOIS.

SELF-FUSING SOLDER.

1,151,679.  Specification of Letters Patent.  Patented Aug. 31, 1915.

Application filed October 19, 1911. Serial No. 655,541.

*To all whom it may concern:*

Be it known that I, LESTER S. GRAVES, a citizen of the United States, residing at Evanston, in the county of Cook and State of Illinois, have invented certain new and useful Improvements in Self-Fusing Solder, of which the following is a specification.

This invention relates to improvements in solder, and refers more specifically to improvements in self-fusing solder.

Among the salient objects of the invention are to provide as a new article of manufacture a product which can be applied to a joint to be soldered and after application ignited, and by burning its combustible constituents supply the heat necessary to effect soldering; to provide a construction which is extremely convenient and capable of ready application; to provide an article which may be applied without the use of any tools whatever; to provide an article which insures well soldered joints by reason of the effective heating of the joint and uniform distribution of the material; to provide an article which is composed entirely of non-liquid materials and can therefore be shipped in cardboard or other cheap packages; and in general, to provide an improved article of the character referred to.

To the above ends the invention consists in the matters hereinafter described and more particularly pointed out in the appended claims.

In the drawing—Figure 1 is a perspective view of a joint with the self-fusing solder applied ready for ignition; Fig. 2 is an elevation of a joint with the self-fusing solder applied and about one-half the length thereof fused and the incombustible core partly unwrapped; Fig. 3 is an enlarged longitudinal sectional view of a part of the joint shown in Fig. 1; Fig. 4 is a perspective of a fragmentary portion of the solder, one end thereof partly unfolded.

A preferred embodiment of my invention is constructed as follows: A cord or strand 1 of absorbent material and practically non-combustible is provided and charged with tallow or tallow-like material. I prefer to use asbestos for the core, and I prefer to use a mixture of tallow and paraffin, or paraffin and stearin, of tallow-like consistency for charging the core. The oily material used to charge the core is the combustible which supplies the heat for soldering. I prefer to make this oily material somewhat softer than is suitable for candle-making so that it is not friable at normal temperatures, and to this end I add a small proportion of turpentine to the mixture. The cord or core is conveniently charged by passing it through a vessel containing the melted oil. This core is then inclosed in a jacket of solder which is preferably formed up into tubular shape surrounding the core by passing the core and ribbon together through a suitable forming die.

In the several figures, 2 designates the solder jacket of the article, and it will be noted that the seam where the edges of the ribbon are brought together around the core extends longitudinally throughout one side of the article, as indicated at 3.

The article is ordinarily used by wrapping it around the joint to be soldered. The core tends to unwrap under the action of burning, and to overcome this tendency I prefer to provide the core with a spiral wrapping of fine soft wire, as indicated at 4; the turns of wire being of very long pitch, say about one turn to the inch.

For soldering wires up to No. 8 gage, I prefer to make the core about 1/10 inch in diameter, the jacket about 1/100 inch in thickness, and of a width to just nicely close snugly around the core, and the soft wire wrapping 4 of about No. 24 gage.

The article may be used substantially as follows: Assume that a pair of telephone or telegraph wires have been twisted together and the joint is to be soldered, the operator takes a suitable length of the self fusing solder, say a piece about five inches long, lays one end of it obliquely across the strands of wire, taking care to have the seam or joint 3 of the solder on the outside away from the point of contact with the wire. He then wraps the free end of the solder around the wires in spiral turns, placing these turns closely adjacent and preferably in actual contact with each other, and being careful to keep the seam or joint of the solder always at the outside. As the strand is bent around the members of the joint, the jacket automatically opens along the seam into trough-shape, thus exposing the core quite fully at the outside of the turns. The entire length is wrapped around the joint, and is then in readiness for ignition. The workman then ignites the core, preferably igniting both ends of the core, and if he prefers he may also ignite it throughout the full length so that it will all burn off together. It is desirable to ignite both ends at the outset because this minimizes the amount of heat which is conducted away by the wires and results in heating the latter hotter. The solder is melted by the burning core and flows into the interstices of the joint and between the core and the wires. The asbestos core serves as a mat, which in conjunction with the wires prevents the solder from dropping off no matter how hot the joint is made, unless, of course, there is a surplus of solder, but in any event retains the most of the solder inside of the turns of the core and in the joints between the pieces of wire to be united. The fine strand of wire 4 simply serves the purpose of preventing the core from unwrapping and spacing itself away from the wires while the combustion is proceeding.

The dimensions and proportions of the various components of the article may, of course, be varied to suit different conditions. It is by no means essential that the solder completely jacket the core, nor that the solder be combined with the core in the particular manner described, although this form has proved in practice the best known to me. Accordingly the appended claims are to be construed broadly, except in so far as they are made specific.

I claim as my invention:

1. In combination, a length of flexible non-metallic solder-and-combustible-supporting material, itself practically incombustible by ordinary heat and flame, so as to preserve its integrity and retain its solder-supporting function in the presence of combustion, a quantity of combustible material, adapted to support combustion in air, associated with said length of flexible material, and a quantity of solder likewise associated therewith and disposed in sufficiently distributed or attenuated form to be melted by the heat of combustion of said combustible material.

2. In combination, a core of porous material, a charge of combustible substance impregnating said core and a wrapping of solder upon said core.

3. In combination, an asbestos strand, charged with non-liquid combustible and a wrapping of solder upon said strand.

4. In combination, an asbestos core, charged with non-liquid oleaginous material, and a ribbon of solder inwrapping said core.

5. In combination, an asbestos core, charged with non-liquid oleaginous material, a ribbon of solder inwrapping said core, and a strand of fine soft wire associated with the core and adapted to restrain it from unwinding while burning.

LESTER S. GRAVES.

Witnesses:
 CHARLES J. SCHMIDT,
 EMILIE ROSE.